April 5, 1938.    J. HUTCHINSON    2,113,348
DISPLAY UNIT
Original Filed Feb. 2, 1932    6 Sheets-Sheet 2

Inventor
Job Hutchinson,
By Stone, Boyden, Mack & Hahn,
Attorneys

April 5, 1938.     J. HUTCHINSON     2,113,348
DISPLAY UNIT
Original Filed Feb. 2, 1932      6 Sheets-Sheet 3

Inventor
Job Hutchinson,
By Stone, Boyden, Mack & Hahn,
Attorneys

April 5, 1938.  J. HUTCHINSON  2,113,348
DISPLAY UNIT
Original Filed Feb. 2, 1932  6 Sheets-Sheet 4

Inventor
Job Hutchinson,
By Stone, Boyden, Mack & Hahn,
Attorneys

April 5, 1938.　　　　J. HUTCHINSON　　　　2,113,348
DISPLAY UNIT
Original Filed Feb. 2, 1932　　6 Sheets-Sheet 5
FIG. 9.
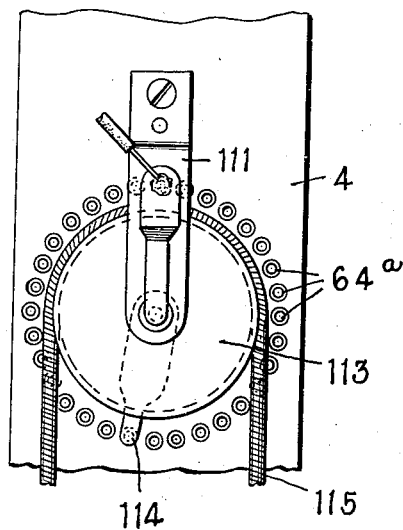
FIG. 8.
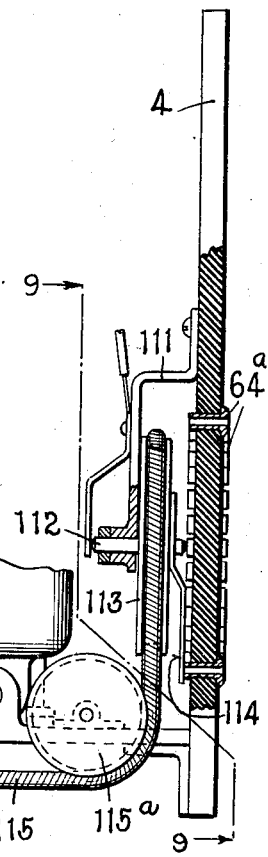
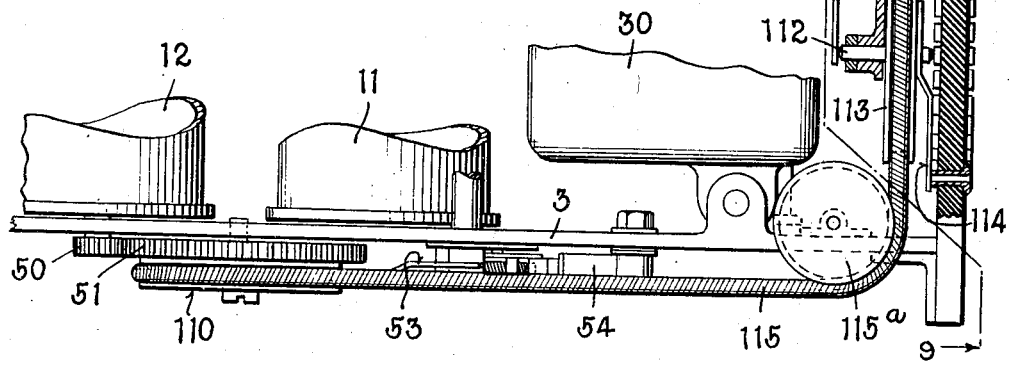
Inventor
Job Hutchinson,
By Stone, Boyden, Mack & Hahn,
Attorneys

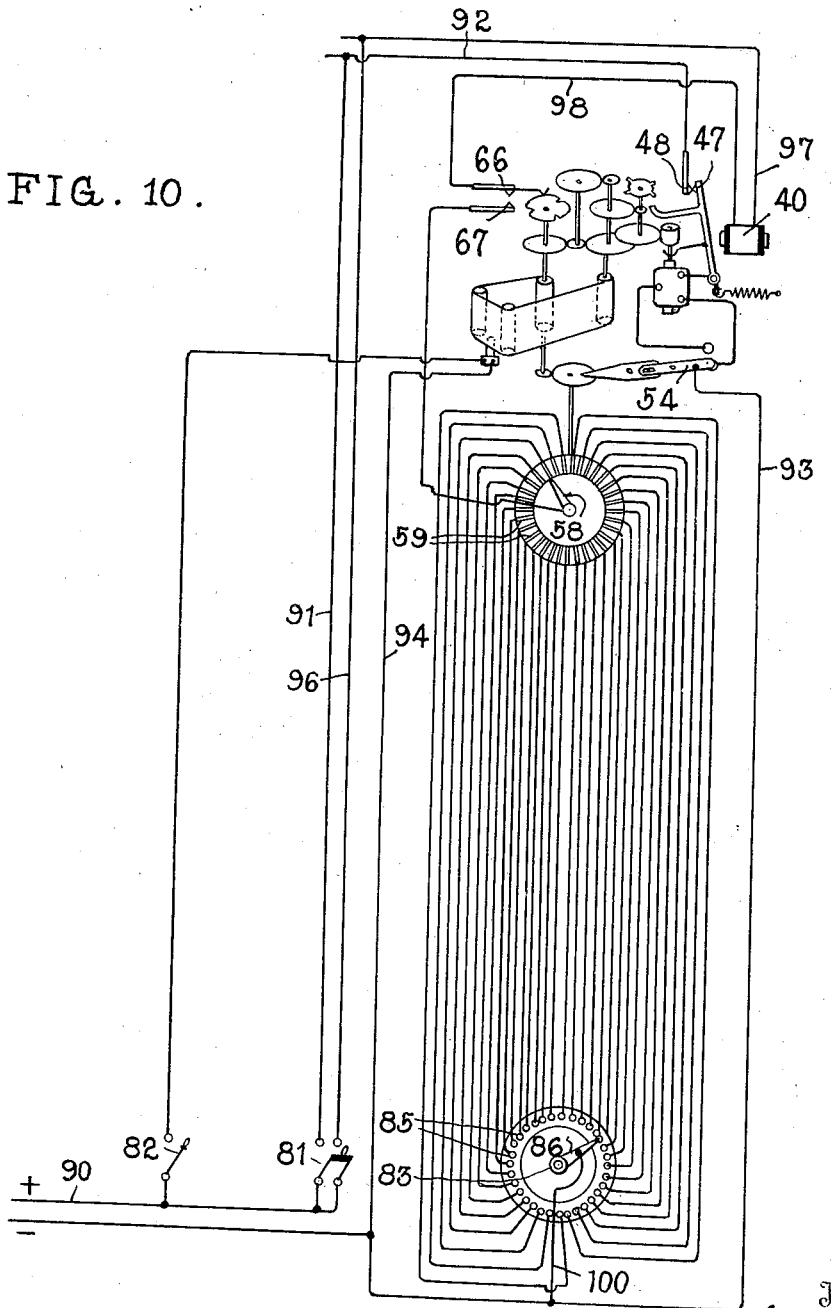

Patented Apr. 5, 1938

2,113,348

UNITED STATES PATENT OFFICE 2,113,348

DISPLAY UNIT

Job Hutchinson, Great Neck, N. Y.

Original application February 2, 1932, Serial No. 590,484. Divided and this application December 30, 1932, Serial No. 649,623. Renewed February 14, 1938

8 Claims. (Cl. 177—337)

This invention relates to changeable exhibitors, and more particularly to electrically operated, remote controlled display units, adapted to be assembled in groups to produce lines of reading matter.

The present application is a division of application Serial No. 590,484, filed February 2, 1932, relating to display systems of this character, and is directed to improvements in the construction of a single display unit, and the means for controlling the same.

One object of the invention is to provide a simple and compact display unit having a pair of reels on which is wound a web bearing a series of individual characters visible, one at a time, through a display opening.

Another object of the invention is to provide a self-contained, electrically operated unit of the above type capable of being quickly and readily attached to or removed from a frame carrying the necessary wiring, and having within itself an electric motor and means for controlling the circuit thereof.

Still another object is to devise improved means for controlling such display unit from a distant station, whereby any given one of a plurality of individual characters which it is desired to display may be selected and brought into display position.

A further object of the invention is to provide means, in addition to the manually controlled selector means, for ensuring that the character selected is caused to register accurately with the display opening.

A still further object is to devise automatic means for reversing the direction of travel of the web just before the limit of its possible movement in either direction is reached, whereby any desired characters may be successively brought into display position by a simple manipulation of the manually controlled selector means, regardless of the relative position of such characters on the web.

With the above and other objects in view, the invention consists in the construction, arrangement and combination of parts hereinafter described and claimed, and illustrated in the accompanying drawings, forming part of this specification, and in which:

Fig. 8 is a fragmentary side elevation of a modified arrangement of the distributor switch mechanism, parts being in section;

Fig. 9 is a fragmentary sectional elevation thereof substantially on the line 9—9 of Fig. 8; and Fig. 10 is a diagram showing the control circuits by which the display unit is operated, the mechanical elements of the unit itself being illustrated conventionally.

Figure 1:
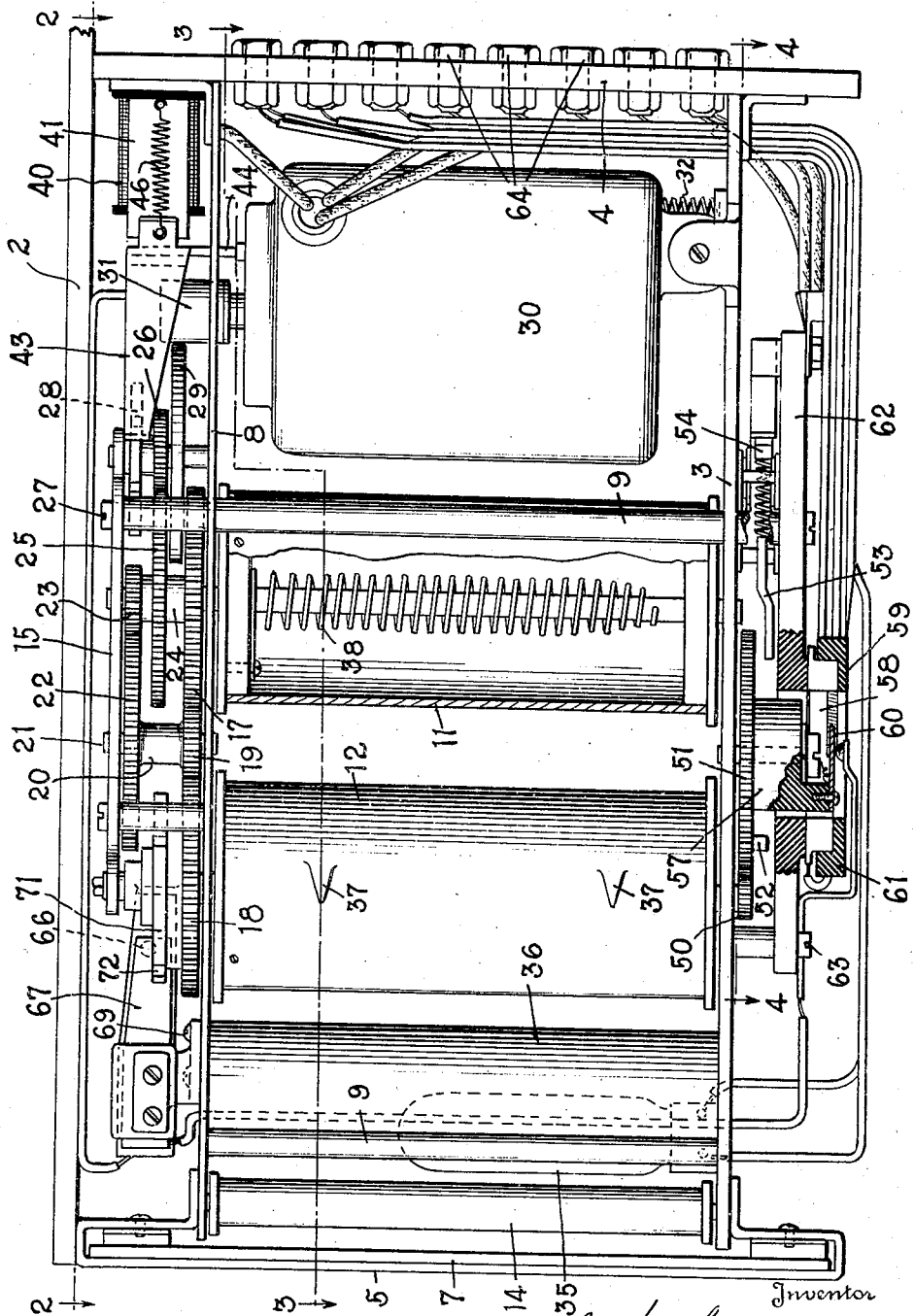
Fig. 1 is a side elevation of my improved display unit, parts being in section.
Figure 2:
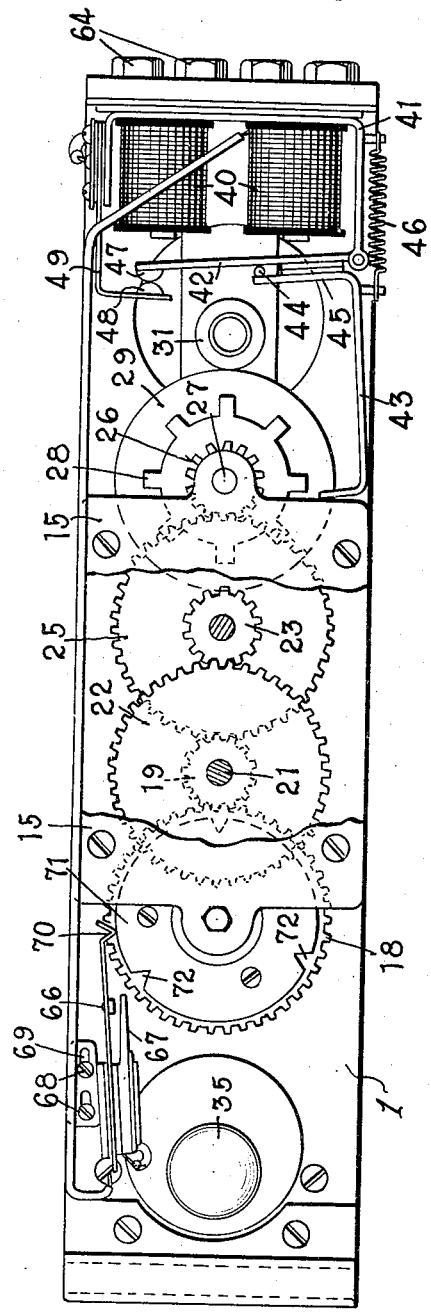
Fig. 2 is a horizontal section substantially on the line 2—2 of Fig. 1 looking in the direction of the arrows.
Figure 3:
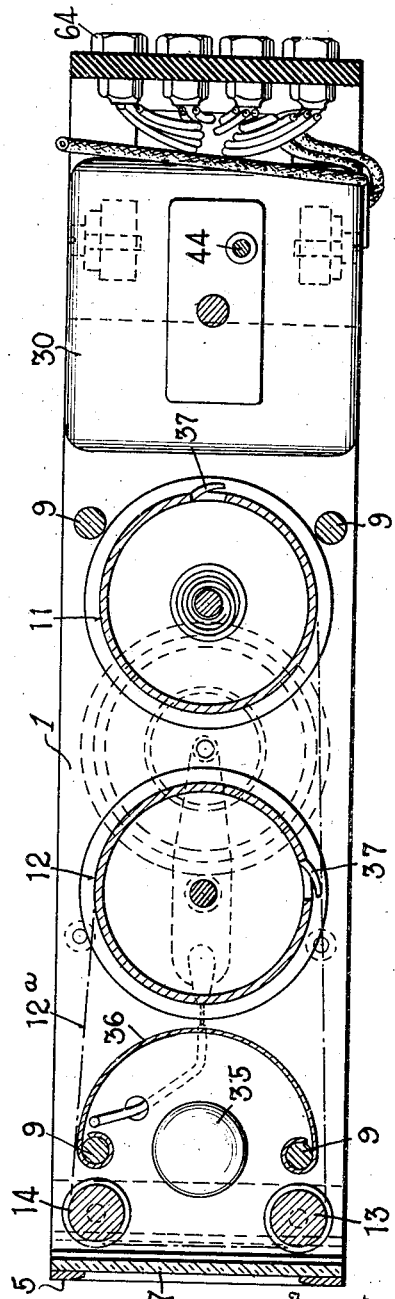
Fig. 3 is a horizontal section substantially on the line 3—3 of Fig. 1 looking in the direction of the arrows.

Describing the various parts by reference characters and referring particularly to Figs. 1, 2 and 3, I denotes generally a rectangular framework of the display unit. This framework is relatively long and narrow, and consists of upper and lower horizontal members 2 and 3, a rear vertical member 4 and a front panel 5, the latter having a display opening 6 therein (Fig. 5) behind which is disposed a glass or other transparent plate 7. Arranged parallel with and in spaced relation with respect to upper member 2 is a shelf 8 which is supported from lower member 3 by a plurality of tie rods 9.

Journalled between shelf 8 and lower member 3 are a pair of winding drums or reels 11 and 12 and a pair of idler rolls 13 and 14. The central vertically disposed shaft of drum 11 extends upwardly through shelf 8 and is journalled in a horizontally disposed plate 15 which is supported by shelf 8. The shafts of winding drums 11 and 12 each have rigidly secured thereto a gear 17 and 18 respectively and disposed intermediate these gears and in mesh therewith is a pinion 19. Pinion 19 is carried by a sleeve 20 which is journalled on a stub shaft 21 that is supported by shelf 8 and plate 15. This sleeve also carries a gear 22 which meshes with a pinion 23 that is mounted on a sleeve 24, the latter being journalled on the extended portion of the shaft of winding drum 11. This sleeve also carries a gear 25 which in turn meshes with a drive pinion 26 that is mounted on a stub shaft 27. As shown in Figs. 1 and 2, the shaft 27 is journalled between shelf 8 and plate 15 and this shaft also has rigidly mounted thereon a notched stop wheel 28 and a friction drive disk 29.

Pivotally mounted on lower member 3 is a vertically disposed reversible electric motor 30 which is fitted with a friction drive wheel 31 that is engageable with the friction disk 29. As shown in Fig. 1, the pivotal support for motor 30 is to the right of the vertical axis thereof, so that normally the force of gravity tends to maintain friction wheel 31 engaged with disk 29, and to further assist such engagement, a compression spring 32 is arranged between member 3 and the motor casing.

Figure 5:
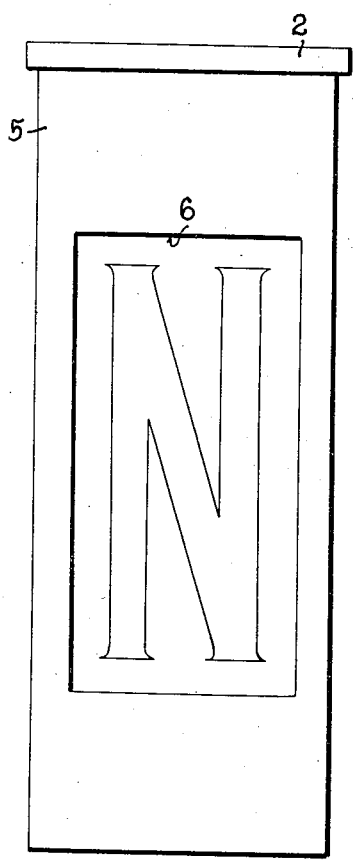
Fig. 5 is a front end elevation of the unit.

From the foregoing description, it will be obvious that when the motor is energized, friction drive wheel 31 will rotate disk 29 and pinion 26, which in turn will drive gear 25, pinion 23, gear 22, pinion 19 and gears 17 and 18 in the same directions, thereby unwinding a suitable display web or ribbon from one of the drums and winding it on the other, dependent upon the direction of rotation of the motor. This ribbon extends from one winding drum, about idler rolls 13 and 14, and to the other winding drum as indicated by the dot and dash line 12ᵃ in Fig. 3. The web or ribbon may be made of any suitable material, but is preferably substantially opaque and is provided with a plurality of translucent letters and/or other symbols which are adapted to be positioned one at a time behind the glass panel 7 and at the display opening between idler rolls 13 and 14. As shown in Fig. 5, each individual letter or character substantially fills the display opening. Arranged at the back of the ribbon is an electric light 35 and a reflector 36.

The web or ribbon may be of any suitable length and has its ends attached to the drums or reels, being preferably detachably secured thereto by prongs 37 which are struck up from each drum (Figs. 1 and 3). The ribbon is maintained taut by providing a slight tension thereon through the medium of a torsion spring drive 38 interposed between drum 11 and its shaft, as described in detail in my prior Patent No. 2,025,242 dated December 24, 1935.

The mechanism for engaging and disengaging the motor friction drive wheel 31 with friction disk 29 will now be described. Mounted on the upper end of rear frame member 4 is an electromagnet 40 which is adapted to be energized at certain predetermined times as described in detail hereinafter. An arm 41 projects along one side of the magnet and pivotally supports an armature 42. This armature carries a detent 43 which is adapted to engage notched stop wheel 28 when the magnet is energized and attracts the armature. Projecting upwardly from the motor 30 is a pin 44 which is confined between armature 42 and a plate 45 carried thereby. A spring 46 arranged between detent 43 and the arm 41 tends normally to maintain the armature away from the magnet. The free end of the armature is fitted with an electrical contact 47 which is adapted to engage a fixed contact 48 that is carried by an arm 49 which projects from the opposite side of the magnet. From the foregoing description, it will be obvious that when the magnet 40 is energized, the armature 42 will be attracted, thereby rocking motor 30 about its pivotal mounting and disengaging friction wheel 31 from disk 29. Such movement also at the same time opens contacts 47 and 48 and engages detent 43 with stop wheel 28 to instantly stop the rotation of the gearing and drums 11 and 12 and prevent any possible coasting thereof.

Figure 4:
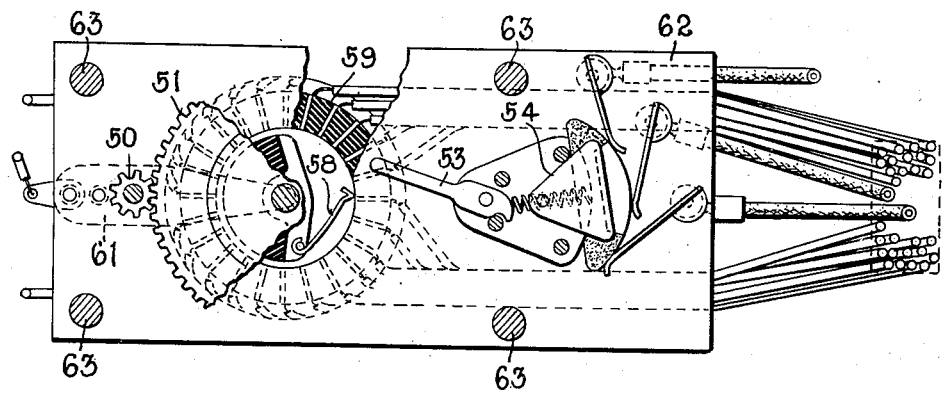
Fig. 4 is a section substantially on the line 4—4 of Fig. 1 looking in the direction of the arrows.

Disposed beneath frame member 3 is a power driven rotary switch or distributor and an automatic motor reversing switch. Referring to Figs. 1 and 4, it will be noted that the shaft of winding drum 12, which is connected with the motor driven mechanism, projects down through member 3 and is fitted with a drive pinion 50 that meshes with a gear wheel 51. This gear wheel carries a pin 52 which is adapted to engage a lever 53 of a toggle operated motor reversing switch 54, it being apparent that when the pin engages the lever on one side, the switch will be moved with a snap action in one direction to reverse the motor, whereupon the gear wheel 51 will be rotated in an opposite direction through substantially 360° whereupon the pin 52 will engage the lever 53 on the opposite side and move the switch to its former position. The ratio between the pinion 50 and gear 51 is such that a rotation of the drums sufficient to cause the entire series of characters on the web or ribbon to pass by the display opening produces a full revolution of the gear 51. Thus if the first character is at the display opening, and the motor started, it will, unless stopped, continue to run until after the last character has reached and moved beyond the display opening, and thereupon the reversing switch will be operated as above described, and the motor caused to run in the reverse direction. Then, until the motor is stopped as hereinafter described, the series of characters will be carried back past the opening in the opposite direction. It will thus be seen that I have provided automatic means for reversing the motor after each end of the series of characters reaches the display opening, or, what amounts to the same thing, just before the web is completely unwound from one or the other of the reels.

Fastened to gear 51 is a downwardly projecting insulating block 57 which carries a contact arm or finger 58 constituting part of the distributor, and which sweeps over a cylindrical distributor ring 59. The contact arm or finger 58 is electrically connected with a metallic plate 60 that is mounted on block 57, and exterior electrical connection is established by a stationary contact arm 61 that bears on plate 60. The distributor ring 59 and motor reversing switch 54 are carried by an insulating plate 62 that is supported from lower frame member 3 by screws 63. The distributor ring is made up of an annular series of spaced and separately insulated metallic segments, each of which is connected with a wire that extends to a jack 64 mounted on rear frame member 4. In practice there will be one segment for each character on the display ribbon and the function of the distributor ring and contact arm or finger is to automatically complete an electrical circuit when a predetermined selected character on the ribbon has reached its approximate display position and thereby to automatically disconnect the motor 30 and stop the movement of the ribbon and associated parts.

Referring now to Figs. 1 and 2, it will be noted that a pair of contacts 66 and 67 are adjustably mounted on shelf 8 by screws 68 engaged through slotted openings 69 in the supporting arm for the contacts. Contact finger 66 is extended as shown in Fig. 2 and at its outer extremity is provided with a V-shaped lateral projection 70 which bears against the periphery of a disk 71 that is mounted on and rotatable with gear wheel 18 forming part of the reel driving mechanism. This disk in the present instance is formed with three equally spaced notches 72 in its periphery which are of sufficient depth to permit projection 70 to enter them to such an extent as to close contacts 66 and 67. In the present instance, the diameter of the winding drums 11 and 12 is chosen so as to give off three characters for each revolution, hence disk 71 is also provided with three notches which are so arranged that at every one-third of a revolution of the drums 12, or, in other words, as each successive character reaches and registers with the display opening, the projection 70, dropping into a notch 72, serves to close contacts 66 and 67.

Figure 6:
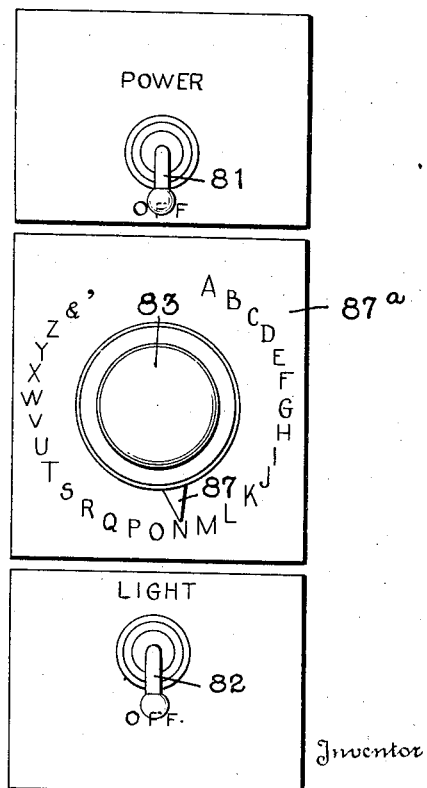
Fig. 6 is a front elevation of the control panel by means of which the unit is operated.

For the purpose of controlling the display units, I provide control means (Figs. 6 and 7) which includes a power switch 81, a light switch 82, and a manually operated selector switch 83. The selector switch comprises an insulating plate 84 on which are mounted a circular series of contacts 85, similar in number to the segments of distributor 59. A contact arm 86 is engageable with each of contacts 85 by rotating control knob 83 in either direction. A wire leads from each contact 85 to a corresponding segment of distributor 59, such wires being designated in their entirety in Fig. 7 by the numeral 85ª, and preferably connected to plugs 85ᵇ, adapted to cooperate with the jacks 64, shown in Fig. 1. For convenience, the selector knob 83 is provided with a pointer 87 which sweeps over a dial or index plate 87ª bearing the different characters, so that the operator may select any individual character which it is desired to display. It will of course be understood that at the end of the series of characters on the web or ribbon there is a blank space, preferably opaque, and similarly, it will be observed, a blank space is provided between the beginning and end of the series of characters on the dial or index plate 87ª, shown in Fig. 6. It is frequently as necessary to be able to select a blank, as to select a character.

Figure 7:
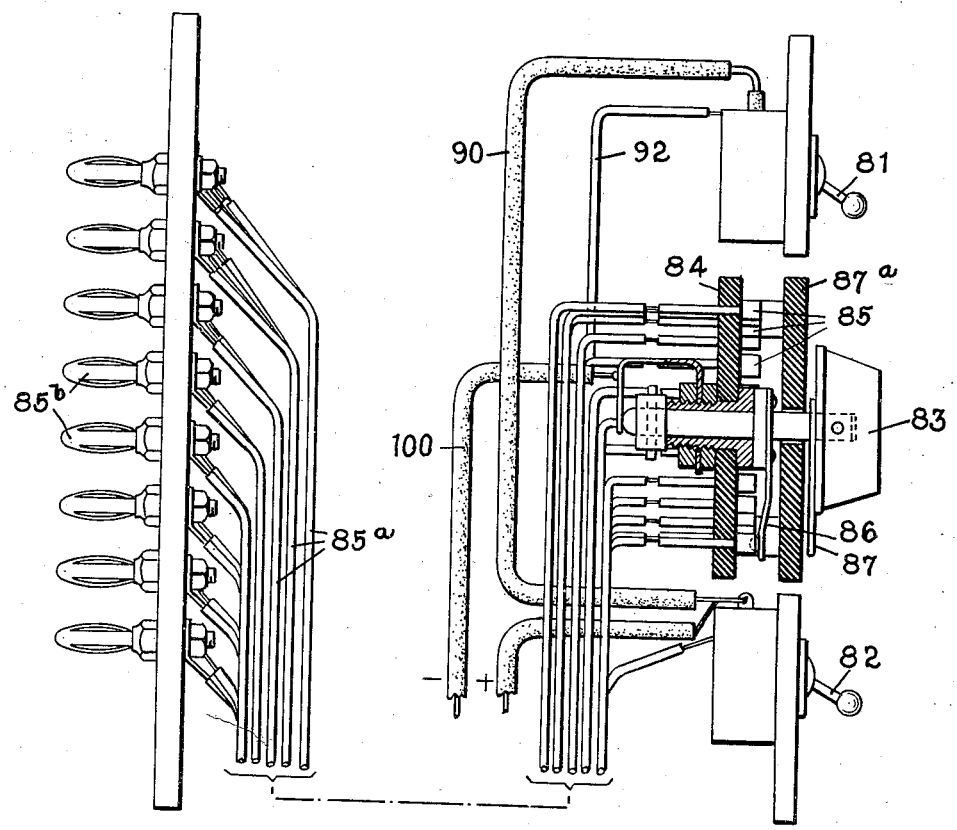
Fig. 7 is a side elevation of such control panel, parts being in section and the control wires and plugs being illustrated.

Referring now to Fig. 10, we will consider the operation of a unit, as controlled by a selector, a power switch and a light switch, such as illustrated in Fig. 7, these elements being given the same numerals in Fig. 10.

From an inspection of Fig. 10, it will be seen that each of the segments 59 of the distributor associated with the unit is connected by a separate circuit wire with a corresponding contact 85 of the manually operated selector switch 83. Positive and negative supply mains are shown, the negative main being illustrated as connected to the arm 86 of the selector through wire 100 and the positive main being connected through wire 90, switch 81 and wires 91 and 92 through switch 47, 48 to the motor. The other side of the motor is connected through the reversing switch 54 with wires 93 and 94 which extend to the negative side of the line.

The positive side of the line is also connected through switch 81 and wires 96 and 97 with one side of the magnet 40, from the other side of which extends a wire 98 through contacts 66, 67 to the contact finger 58 of the distributor. It will thus be seen that the circuit of magnet 40 is normally open at two points, namely, the contacts 66, 67, and the distributor and selector, considered together. It will also be understood that when the contact arm 58 of the distributor engages the segment corresponding with the particular contact 85 on which the selector arm 86 rests, the magnet circuit will be closed through the distributor and selector switch and one of the connecting circuit wires, and will be open only at the contacts 66, 67.

It will further be observed that, as above pointed out, the contacts 66, 67 are closed momentarily as each character on the web or ribbon reaches display position, but this closing of the contacts 66 and 67 will have no effect so long as the magnet circuit 40 is open at the distributor and selector. Thus, there are two breaks in series in the circuit of magnet 40 and in order for the magnet to become energized it is, of course, necessary that both breaks be closed at the same time.

Let it be supposed that the letter "A" appears at the display window and that it is desired to shift the ribbon so as to bring the letter "K" into display position. The operator turns the arm 86 of the selector switch in either desired direction by means of the knob 83 until the pointer 87 indicates the letter "K". Thereupon, he closes the power switch 81. Current will immediately flow from the positive side of the line up through this power switch and over wires 91 and 92 through contacts 47, 48 and thence through the motor to the other side of the line. The motor will begin to run and will drive the drums or reels 11 and 12, through the gearing heretofore described, so as to cause the characters B, C, D, etc., to be successively displayed. The motor will continue to run until the letter "K" reaches display position. When this occurs the contact finger 58 will have engaged the particular segment 59 which is connected with the particular contact 85 on which the arm 86 rests. Simultaneously, and precisely when the letter "K" registers accurately with the display opening, the contacts 66, 67 are closed and the magnet 40 energized. The armature 42 is attracted and performs three functions at the same time, namely, it opens the motor circuit at the contacts 47, 48, it pulls the friction wheel 31 away from the wheel 29, thus interrupting the driving connection, and it causes the detent 43 to engage the toothed wheel 28, thus locking the gearing and reels and instantly arresting the movement of the web or ribbon.

Let it be assumed next that, the letter "K" having been displayed, as above described, it is next desired to display the letter "I". The operator turns the selector switch 83 two positions backward, that is to say, from K to I (or he might turn it nearly all the way around in a forward direction, if preferred). He then closes the power switch 81 thus again energizing the motor 30. The motor will continue to run in the same direction as before, carrying the characters L, M, N, etc., successively past the display opening until the last character or blank space is reached, whereupon, as above described, the reversing switch will be actuated, and the motor will then run in the reverse direction, causing all of the characters to pass in reverse order by the display opening until the letter "I" is reached. When this letter comes into display position the magnet 40 will be again energized, as previously described, and the web or ribbon stopped.

It will thus be seen that when a second character is selected by the operator, and the power switch closed, the motor will run and move the web either directly to the selected character, if such character is subsequent in the series to the one previously selected, or it will move the web first in one direction to the end of the series and then back in the reverse direction until the selected character reaches display position, if the character selected is in advance of the one previously displayed. It will, therefore, be seen that my improved display unit will operate automatically to display any selected character, regardless of whether such character is in advance of or behind the character previously displayed.

It will be further appreciated that it would be impossible to arrest the movement of the web so as to bring the desired character accurately into display position if reliance were had solely upon the distributor segments, because the contact arm of the distributor moves only a small fraction of the distance traveled by the web and consequently any small error would be greatly magnified. The distributor ring, selector switch and associated parts and wires may be regarded as an approximate or main governing device or circuit closing means, while the contacts 66, 67 and notched disc 71 constitute an accurate or auxiliary governing device or circuit closing means, and as above pointed out, these two devices must act simultaneously in order to produce the desired results.

From the foregoing, it will be seen that it has been assumed that equal angular movements of the reel 12 produce equal linear displacements of the web or ribbon. In practice, however, this is not strictly true, because the effective diameter of the reel changes as the web is wound thereon or unwound therefrom. Thus, if the characters were uniformly spaced upon the web, it will be seen that a different angular movement of the reel would be required to shift from one character to the other near the beginning of the series, than would be necessary to shift from one character to the next, near the end of the series.

In order, however, to compensate for this changing effective diameter of the reel, and to insure that each of the characters throughout the series is accurately centered in the display opening, I progressively vary the spacing of the characters on the web from one end of the series to the other. By this simple expedient I am enabled to achieve the result that the same angular movement of the reel is required to shift the web from one character to the next, throughout the entire series of characters. Therefore, the auxiliary governing device comprising the contacts 66, 67 which cooperate with notches in the edge of the reel, serves to cause each character to accurately register with the display opening, whatever the position of the character in the series may be.

In any case, after the desired character has been brought into display position, the operator closes light switch 82a, and this, through the circuit connections shown in Fig. 10, serves to illuminate lamp 35 so as to render the character clearly visible. It will further be understood that after the power switch 81 has been closed and the motor operated as above described, it should then be opened before the selector is again manipulated.

While I have shown and described the web or ribbon as adapted to display single letters or characters, one at a time, it will, of course, be understood that the same principle of operation may be employed in connection with a web having thereon complete legends or items of information. Therefore, wherever I use the word "character" in the specification or claims I intend it to be understood as including either individual symbols or complete legends.

In Figs. 8 and 9, I have shown a slight modification of the distributor switch mechanism. In this instance, instead of mounting the distributor switch arm on the gear 51, I provide such gear with a pulley 110. The rear frame member 4 carries a plurality of jacks 64a, as before, but in this case the jacks are arranged in a circular series. These jacks extend through the member 4 and constitute contacts on the rear face thereof. A bracket 111 supports a shaft 112 on which is mounted a pulley 113 that carries a contact arm 114 which engages the jack contacts. A flexible belt 115, passing around idlers 115a, interconnects pulleys 110 and 113. In this form of construction, the cable of wires between the distributor and jacks is eliminated. The other parts of the unit are identical with those previously described and the operation is identical. It will of course be understood that when the jacks are arranged in a circular series as shown in Figs. 8 and 9, the plugs on the board will also be grouped in a corresponding circular series instead of in rectangular formation, as previously described.

What I claim is:—

1. In a changeable exhibitor, the combination with a movable display web bearing a plurality of characters and a pair of reels to which the ends of said web are secured, of a reversible motor for driving said reels to wind the web on one and unwind it from the other, a remote control device comprising in combination a selector switch and an indicator, the characters on said indicator corresponding with those on said display web, and means including said selector switch whereby said motor is caused automatically to move said display web in one direction only or first in one direction until it is nearly completely unwound from one reel and then in the other, to bring the selected character to and stop it in display position, in accordance with the particular character selected.

2. In a changeable exhibitor, the combination with a movable display web bearing a series of characters, and a pair of reels to which the ends of said web are secured, of a reversible motor for driving said reels, a manually operated selector switch having a corresponding series of characters, automatic means including said motor and selector switch, serving, if the character selected by said switch is at one side of the previous one, to move said display web in one direction and stop it with the selected character in display position, and serving, if the character selected is at the other side of the previous one, to move said display web first in one direction until the end of the series of characters is reached, and then back in the opposite direction until the selected character reaches display position.

3. In a changeable exhibitor, the combination with a display element of definite length, bearing between its ends a series of characters and longitudinally movable in two directions, of reversible driving means for moving said element, a selector device constituting means for controlling said display element, said device having a corresponding series of characters, means connected with said element for reversing said driving means, and means including said driving and reversing means and automatically governed by said selector device for causing said display element to move so as to bring into display position the character selected, said movement taking place in one direction only or first in one direction until the end of the travel of said element is reached and then in the other, in accordance with whether the character selected is in advance of or behind the previous one in the series.

4. In a changeable exhibitor, the combination with a display web bearing a series of characters, and a pair of reels to which the ends of said web are secured, of a reversible motor for driving said reels to wind the web on one and unwind it from the other, a governing device having a member mechanically connected with said motor, manually operated means at a remote station for controlling at will said governing device so as to cause it to select any desired character, and means including said governing device whereby said motor is caused automatically to move said display web in one direction only, or first in one direction until it is nearly completely unwound from one reel, and then in the other, to bring the selected character to and stop it in display position, in accordance with the particular character selected.

5. In a changeable exhibitor, the combination with a display web bearing a series of characters, and a pair of reels to which the ends of said web are secured, of a reversible motor for driving said reels, a governing device having a member mechanically connected with said motor, means including circuit wires and a manually operated switch for controlling at will said governing device so as to cause it to select any desired character, and automatic means, including said motor and governing device and a reversing switch, serving, if the character selected is at one side of the one previously displayed, to move said display web in one direction and stop it with the selected character in display position, and serving, if the character selected is at the other side of the one previously displayed, to move said display web first in one direction until the end of the series of characters is reached, and then back in the opposite direction until the selected character reaches display position, and finally to stop the web in such position.

6. In a changeable exhibitor, the combination with a traveling display element having thereon a plurality of characters, of motor driven mechanism for moving said display element, main circuit closing means comprising a contact arm engaging an annular series of segments, circuit wires, one for each character, extending from said segments to a control station, a manually operated switch at said station for selectively establishing a connection through that one of said circuit wires corresponding with a desired character on said display element, auxiliary circuit closing means, driving connections between said mechanism and both said contact arm and said auxiliary circuit closing means, to actuate said auxiliary circuit closing means as each character reaches exact display position, a normally open motor control circuit including both of said circuit closing means in series, means for putting said motor in operation, and automatic means controlled by the simultaneous closing of both of said circuit closing means for stopping said motor and arresting said display element when the desired character accurately reaches display position.

7. In a changeable exhibitor, the combination with a travelling display element having thereon a plurality of characters, of motor driven mechanism for moving said display element, a main governing device comprising a contact arm engaging an annular series of segments, an auxiliary governing device, both said auxiliary governing device and said contact arm being operatively connected with and driven by said mechanism, a control station, a plurality of circuit wires, one for each character, extending from said segments to said station, a manually operated switch at said station for selectively establishing a connection through that one of said circuit wires corresponding with a desired character on said display element, means for putting said mechanism in operation, and means controlled by said auxiliary governing device for automatically arresting said display element when it reaches the exact position corresponding with that of the segment to which the selected circuit wire is connected.

8. In a changeable exhibitor, the combination with a traveling display element having thereon a series of characters, of motor driven mechanism for moving said display element, a motor controlling circuit having in series therein two normally open breaks, a manually operated switch for selecting any desired character to be displayed, means comprising said switch, a contact arm operated by said mechanism, and an annular series of segments engaged by said arm, for automatically closing one of said breaks when the selected character reaches approximate display position, and means also operated by said mechanism for closing the other of said breaks as each character reaches exact display position, means for putting said motor in operation, and means for automatically stopping said motor when both of said breaks are simultaneously closed.

JOB HUTCHINSON.